United States Patent [19]

Stroup et al.

[11] Patent Number: 4,470,796
[45] Date of Patent: Sep. 11, 1984

[54] APPARATUS FOR MOLDING HOLLOW PLASTIC ARTICLES

[75] Inventors: John F. Stroup, Cuyahoga Falls; Harold J. Robins, Cleveland; Michael Teeple, Brunswick, all of Ohio

[73] Assignee: Van Dorn Company, Cleveland, Ohio

[21] Appl. No.: 431,027

[22] Filed: Sep. 30, 1982

Related U.S. Application Data

[62] Division of Ser. No. 162,179, Jun. 23, 1980, Pat. No. 4,372,910.

[51] Int. Cl.³ ............................................. B29C 17/07
[52] U.S. Cl. .................................... 425/526; 425/529; 425/533; 425/534; 425/538; 425/572; 425/588
[58] Field of Search ............... 425/526, 529, 533, 534, 425/538, 555, 572, 588, 562; 264/532, 535, 537, 538, 523, 328.8

[56] References Cited

U.S. PATENT DOCUMENTS

| | | | |
|---|---|---|---|
| 2,912,719 | 11/1959 | Gilmore et al. | 264/328.8 X |
| 4,242,073 | 12/1980 | Tsuchiya et al. | 425/555 X |
| 4,261,949 | 4/1981 | Spurr et al. | 264/537 X |

FOREIGN PATENT DOCUMENTS

| | | | |
|---|---|---|---|
| 48-13711 | 4/1973 | Japan | 264/328.8 |

*Primary Examiner*—Jan H. Silbaugh
*Attorney, Agent, or Firm*—Pearne, Gordon, Sessions, McCoy, Granger & Tilberry

[57] ABSTRACT

A method and apparatus of making hollow plastic articles are disclosed in which the preforms or other articles are sequentially molded from a continuous stream of plasticized resin supplied by an extruder. The preforms are formed sequentially in a plurality of molds and immediately transferred from the molds to blowing apparatus where they are blown into plastic articles. The molds are disposed in sets of two or more molds each, and the number of blowing apparatus units is equal to the number of sets of molds, with at least two sets of molds being provided. After the preform is formed in one mold of a set of molds, it is transferred while it is still hot to the corresponding blowing apparatus for that set while the extruded stream of plasticized resin is fed into the other molds to form other preforms. The method continuously utilizes the stream of plasticized resin from an extruder and provides the most efficient use of blowing apparatus by providing a number of blowing stations less than the number of total preform molds. The method also results in energy efficiency and avoids plastic degradation by minimizing the length of time at which the plastic resin is at an elevated temperature.

26 Claims, 3 Drawing Figures

APPARATUS FOR MOLDING HOLLOW PLASTIC ARTICLES

This is a division of application Ser. No. 162,179 filed June 23, 1980, now U.S. Pat. No. 4,372,910.

BACKGROUND OF THE INVENTION

1. Field of the Invention

This invention relates generally to a multistage method for making hollow plastic articles which includes molding preforms or other articles and blow-molding preforms into finished plastic articles and apparatus for this method, and particularly to a method and apparatus for making hollow plastic articles, such as molecularly oriented plastic bottles.

2. Description of the Prior Art

In recent years, substantial effort has been directed to the production of plastic bottles used as a replacement, or partial replacement, for glass bottles. The use of such bottles results from the fact that plastic, such as polyethylene terephthalate (PET), when molecularly stretched, is tougher but lighter than glass.

According to the prior art, molecularly oriented containers, such as plastic bottles, have been produced using either a two-stage process or a one-stage process. In the two-stage process, a preform or parison resembling a thick test tube is first injection molded in a parison mold in an operation entirely separate from the blow-molding step. The preform has a completely finished neck with all necessary threading and a neck ring to facilitate downstream handling. The preform, which is about seven inches long for a two-liter bottle, is cooled to room temperature, and stored for subsequent blowing into the finished bottle in a blow mold. At the time of blowing, the preform is fed into a reheat-stretch-blow-molding machine, where the preform is heated, mechanically stretched longitudinally (generally by means of an extensible core pin pushing against the bottom of the preform), and expanded or blown with compressed air. The longitudinal stretching and blowing biaxially orient the PET molecules, contributing to improved strength, barrier properties, and clarity.

The one-stage process incorporates the preform injection molding and stretch-blow-molding process steps in the same machine. The sequence is basically the same, except that there is less cooling and reheating of the preform. The preform is injection-molded in a parison mold, removed from the mold at maximum temperature, transferred directly through one or more temperature conditioning stations to achieve the proper blowing temperature, and then transferred at the blowing temperature to a blow mold where the preform is blown into the finished bottle.

Two-stage processes have also been developed in which the preforms are extruded, cut to a prescribed length, reheated in an oven, and fed into the stretch-blow-molding machine, in which in a single operation, the neck is formed, the preform is mechanically stretched and blown, and the bottom is pinched off. One-stage processes have also been developed in which a parison is extruded, blown into a preform in one mold, after which the preform is biaxially stretched and blown into a finished product in another mold, all of these operations taking place in a single machine.

Various types of single-stage blow-molding methods and apparatus for the formation of different types of plastic articles are disclosed in the following U.S. patents: U.S. Pat. No. 3,555,598 issued to Mehnert; U.S. Pat. No. 3,596,315 to Yoshikawa et al; U.S. Pat. No. 3,694,124 to Saumsiegle et al; U.S. Pat. No. 3,738,788 to Langecker; U.S. Pat. No. 3,887,316 to Hestehave; U.S. Pat. No. 3,940,223 to Farrell; U.S. Pat. No. 3,947,180 to Neumaier; U.S. Pat. No. 3,984,513 to Mulraney; U.S. Pat. No. 3,986,807 to Takegami et al; U.S. Pat. No. 3,963,404 to Polock et al; U.S. Pat. No. 4,140,464 to Spurr et al; and U.S. Pat. No. 4,140,468 to Duga.

Two-stage processes and apparatus for the formation of hollow plastic articles from preformed parisons are shown in many patents including U.S. Pat. Nos. 3,079,637 issued to Marzillier and 3,583,031 issued to Kader et al.

Both the one-step and the two-step processes have certain advantages and disadvantages. Among the advantages of a two-stage process is that efficient and effective use can be made of both the parison-forming and blowing stations which need not be integrated. The preform may be molded at a central location and shipped to several plants for blowing and filling. Preforms for a 64-ounce carbonated beverage bottle take up only 11 cubic inches of shipping space, less than 5 percent of the volume occupied by the finished bottle. Preforms may thus be produced at one location by an experienced custom molder and supplied to a beverage bottler in another location who may operate the blow-molding machine without prior knowledge of melt processing of plastic. However, substantial thermal energy is lost during the total operation, since the preform after formation is cooled down during storage and then reheated at the time of blowing. Moreover, the preforms from storage must be fed to the blowing station, duplicating handling. The one-stage process eliminates heat loss and duplicate handling. About 50 percent less energy per bottle is consumed during the reheating portion of the process. In addition, in the one-stage process, a continuous mechanical grip is maintained on the neck of each bottle from the preform molding stage to the stretch-blow-molding stages. This means that there is no need to release and regrip the bottle, eliminating a possible source of distortion and disfiguration due to contact between the preform and other bodies. In addition, the process maintains the preform temperature very high and achieves a more uniform temperature throughout the wall thickness of the preform, permitting low-pressure blowing with accurate dimensional control reducing processing costs and improving product quality. However, the advantages of the one-stage process are mitigated since, conventionally, the individual components of the system are constructed and arranged as an integral unit, and efficient use of the various system components is not realized, nor are the systems as rapid as desired in commercial manufacture. For each preform station, there is a corresponding blowing station. Since the time required for the preform formation stage is substantially longer than the blowing stage, inefficient use is made of the blowing station.

An additional disadvantage occurs in both one-stage and two-stage processes. In either process, the portion of the machine used to melt the plastic and inject it into the preform mold operates sequentially and is idle during a major portion of its cycle. Thus, one of the important portions of the apparatus is inefficiently used.

As the popularity of certain plastic articles, particularly PET plastic bottles used in the soft drink industry, has increased, the need for increased production of plastic articles has increased. There has been a need for a method for producing plastic articles which will yield production rates higher than those possible with the prior art. At the same time, it has been highly desirable to develop a system which is energy-efficient so that the amount of energy lost during the process is maintained at a minimum. Furthermore, it is highly desirable that all of the components of the apparatus are utilized to their capacity for the maximum amount of time to minimize the equipment investment.

SUMMARY OF THE INVENTION

The present invention provides apparatus for molding plastic articles which overcomes the disadvantages and shortcomings of the prior art and attains advantages heretofore not obtainable. The present invention provides a method for making hollow plastic articles such as bottles or other containers using a single-step process in which production rates are higher than have been possible using prior art one-step injection blow-molding processes and equipment. The present invention overcomes the limitations of the prior art injection molding machines which have been utilized in the formation of preforms. The injection molding process of the prior art for the formation of preforms has limited the amount of preforms that may be obtained. In addition, the present invention overcomes the inefficiency of the prior art single-stage processes which require a separate preform molding station for each blowing station, even though preforms may be blown into the final articles at a rate exceeding the rate at which they may be molded.

The method of the present invention increases production efficiency and overcomes the inefficiencies of the prior art systems by using a continuous extrusion molding process in the formation of preforms, instead of the injection molding processes of the prior art. In accordance with the present invention, a continuously operating extruder is used to provide a plasticized material which may be sequentially fed into one of a plurality of preform molds. In the illustrated form of the present invention, as many as eight or more preform molds are used, all being fed by a single extruder.

As the preforms are finished, a plurality of preform transfer devices may move the preforms from the molds to a corresponding number of stretch-blow-molding machines which complete the process by conditioning the preforms, stretching them, and blowing them into the finished plastic articles.

The process not only produces more consistent quality of the finished product, but also results in more energy-efficient operation and the total alleviation of additional subproduct operations and exterior handling prior to the blowing operation.

The present invention includes a method for making molded plastic articles from a thermoplastic resin material. In the inventive method, plasticized resin is extruded in a hot, pressurized stream, and the stream of resin is directed to a branched runner system which leads to a plurality of molds. The stream is admitted sequentially into each mold to fill the mold with resin to form an article. After each mold is substantially filled, an open connection is maintained between the mold and the pressurized stream to compensate for thermal contraction while the article in the mold cools and while another mold is being filled by the stream of resin. After each article has sufficiently cooled, its mold is cut off from the stream. Each such mold is then opened, and the molded article is removed from the mold.

This extrusion molding method may also be incorporated into the blow-molding method of the present invention. In this method, plasticized resin is extruded in a hot stream, and the stream of resin is directed sequentially into a plurality of preform molds disposed in at least two sets of molds having two or more molds in each set. One or more preforms are formed in each mold. The preforms are transferred sequentially from each mold of each set to a blowing apparatus before the preforms cool substantially. There is a separate blowing apparatus for each set of molds. In the blowing apparatus, the preforms are conditioned and stretched, if necessary, and finally blown into plastic articles.

The present invention also includes apparatus which may be used for performing the method. The apparatus for making molded plastic articles from a plastic resin material comprises an extruder for producing a stream of plasticized resin material. A branched runner system extends from the extruder for containing the stream of plasticized resin material. A plurality of molds is connected to the runner system for forming molded articles from the plasticized material received through the runner system. There are valve means in the runner system associated with each mold for admitting the stream of plasticized resin sequentially and for cutting off each mold from the stream when the mold is opened for removal of the plastic article.

The molds may be disposed in two or more sets each having at least two molds. Means may be provided for blowing the molded articles or preforms into finished articles. The number of blowing means is equal to the number of sets of molds. Means may also be provided for transferring the preforms from each of the sets of molds to the corresponding blowing means.

DETAILED DESCRIPTION OF THE PREFERRED EMBODIMENTS

Figure 1:
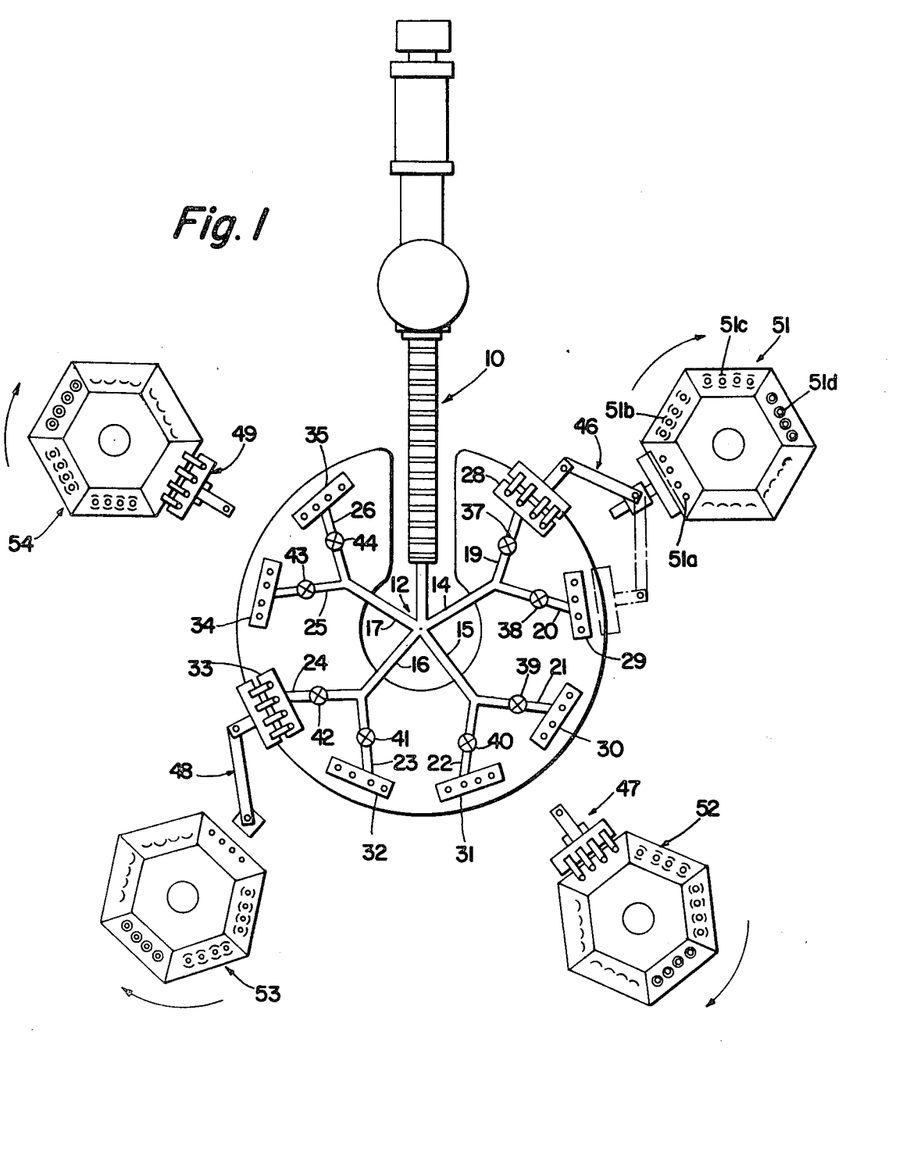
FIG. 1 is a plan view of the apparatus used for practicing the process of the present invention.

Referring initially to FIG. 1, there is shown apparatus of the present invention which may be used for the manufacture of finished plastic articles in accordance with the invention. The apparatus includes an extruder 10. The extruder 10 is of a conventional type and is of sufficient size to produce a plasticized flow of resin as needed. The extruder 10 may be of the type commercially available and commonly used in plastic extrusion machines. It is contemplated that a 105 mm screw extruder may be used for a typical high production operation. The hot plasticized or melted resin material from the extruder 10 goes from the extruder head into the preform molds through a runner system 12 formed by a plurality of small dimensioned pipes or runners. In the form of the invention shown in FIG. 1, a total of four pipes 14, 15, 16, and 17 branch from the extruder head. Each of the pipes 14–17 branches into a pair of pipes 19–26 which leads to one of a plurality of preform molds 28–35.

Each of the pipes 19–26 has a valve 37–44 to permit the melt stream to enter the preform mold. In the form of the invention shown in FIG. 1, a total of eight preform molds 28–35 are disclosed, each having a valve 37–44 to control the flow of plastic into the mold. Each of the valves 37–44 is a dedicated pin-type valve for opening and closing the melt stream to the cavity. The pin valves 37–44 are operated by double-acting pistons. Each of the preform molds 28–35 is of a conventional type used to make preforms from a periodic flow of plastic material such as that produced by an injection molding machine. In accordance with the present invention, the extruder 10 is used in place of an injection unit on a molding machine and a continuous flow of plasticized material is provided. Each mold 28–35 may have one or more preform cavities. Two to four such cavities would be common, and four cavities are illustrated in FIG. 1. A preform is formed in each cavity. The valves 37–44 could alternatively be in the molds instead of in the distribution pipes 19–26 and could also alternatively be a valve at the entrance (commonly called "gate") into each of the preform cavities within the mold.

The molds 28–35 are provided in groups or sets, and in the illustrated form of the invention two adjacent molds comprise each set. For each set (or pair) of molds 28–35, a preform transfer device 46–49 is provided. Each of the preform transfer devices 46–49 is capable of removing the preforms from one mold of a set of the molds 28–35 and transferring the preforms to a rotary stretch-blow-molding apparatus. A stretch-blow molding apparatus 51–54 is provided for each of the preform transfer devices 46–49. In the embodiment of the invention shown in FIG. 1, a total of eight preform molds are used in a system in which the formation of a preform requires twice the time necessary to stretch and blow the preform into a finished article. There is, therefore, a set of two molds for each stretch-blow-molding apparatus, and a total of four preform transfer devices 46–49 and four rotary stretch-blow apparatus 51–54 are provided. The preform transfer devices 46–49 may be of several different types and may be generally of the type known in the prior art such as those disclosed in U.S. Pat. No. 4,011,039 issued to Oas et al. and U.S. Pat. No. 4,106,886, issued to Sokolow. It is also contemplated that specially designed transfer devices may be used.

The rotary stretch-blow-molding apparatus 51–54 may be typical molding station apparatus which include stations at which the preforms are uniformly conditioned or heated to an appropriate temperature and subsequently stretched and blown into a finished article in accordance with known principles of blow-molding art. Preferably, each of the apparatus 51–54 also includes a station at which the finished articles are ejected so that they may be automatically placed on a conveyor mechanism. Although it is contemplated that the rotary-stretch-blow molding apparatus be specially designed and constructed for this purpose, suitably adapted prior art apparatus may be used, such as those found in U.S. Pat. No. 3,596,315 issued to Yoshikawa et al., U.S. Pat. No. 3,963,404, issued to Pollock et al., U.S. Pat. No. 3,986,807, issued to Takegami et al., and U.S. Pat. No. 4,141,680, issued to Kauffman et al.

In accordance with the method of the present invention, pelletized thermoplastic resin material, after being dried in a conventional fashion, is plasticized into a melt stream by the extruder 10 on a continuous basis. The hot pressurized stream produced by the extruder 10 is piped from the extruder head through the runner system 12 to a first preform mold, then sequentially to the other molds. For example, the melt stream first flows through the open valve 37 to fill the mold 28 while all of the other valves 38–44 are closed. Then the mold 30 is filled by opening the valve 39. The piping of runner 19 to the previously filled mold 28 is kept open to provide packing pressure and a small amount of make-up melted resin to compensate for shrinkage during cooling. This pressure is also used to fill the next mold 30. After a minimum period of time, to allow sufficient cooling and shrinkage compensation flow, the valve 37 may be closed and the molded preforms removed from the mold 28. Molds 32, 34, 29, 31, 33, and 35 are then sequentially filled in the same manner by opening valves 41, 43, 38, 40, 42, and 44, in sequence. There is a continuous flow of plasticized resin from the extruder 10 into the runner system 12. The speed of rotation of the screw of the extruder 10 is constant and the output of the extruder is matched to the requirements of the preform molds. Unlike an injection molding apparatus, there is no shut-off valve at the outlet of the extruder 10.

Each preform mold 28–35 is filled by the pressurized melt stream in an intrusion-like fashion. All of the molds 28–35 are identical and will be described with reference to the mold 28. Assuming that the individual cycle of the mold 28 is X seconds, cavity filling occurs during an aliquot portion of X seconds, i.e., X/c, where c is the total number of preform molds used and is equal to 8 in the embodiment of the invention shown in FIG. 1. The valve 37 associated with the mold 28 remains open as required for any additional filling to compensate for thermal contraction and for maintaining mold contact for maximum heat transfer during the initial part of the cooling. Thereafter, the valve 37 is closed. Meanwhile, the valve 39 has opened immediately upon the initial filling of the mold 28, directing the stream of melt from the runner system 12 into the mold 30. After the valve 37 is closed, the molded preforms in the mold 28 are further cooled, the mold is opened, the preforms are removed, and the mold is reclosed. A similar molding cycle begins every X/c seconds for one of the other molds 30, 32, 34, 29, 31, 33, and 35. Each of the molds is filled every X/c seconds, and the valve for each mold remains open as required for any additional filling to compensate for thermal retraction and for maintaining mold contact for maximum heat transfer during the initial part of the cooling. Thereafter, the valve 37 is reopened so that the mold 28 will again begin to be filled, beginning another mold cycle. One of the c molds is, in turn, filled in a similar fashion every X/c seconds. Therefore, all of the molds are filled every X seconds and the output of the extruder 10 is totally utilized on a continuous basis.

Figure 2:
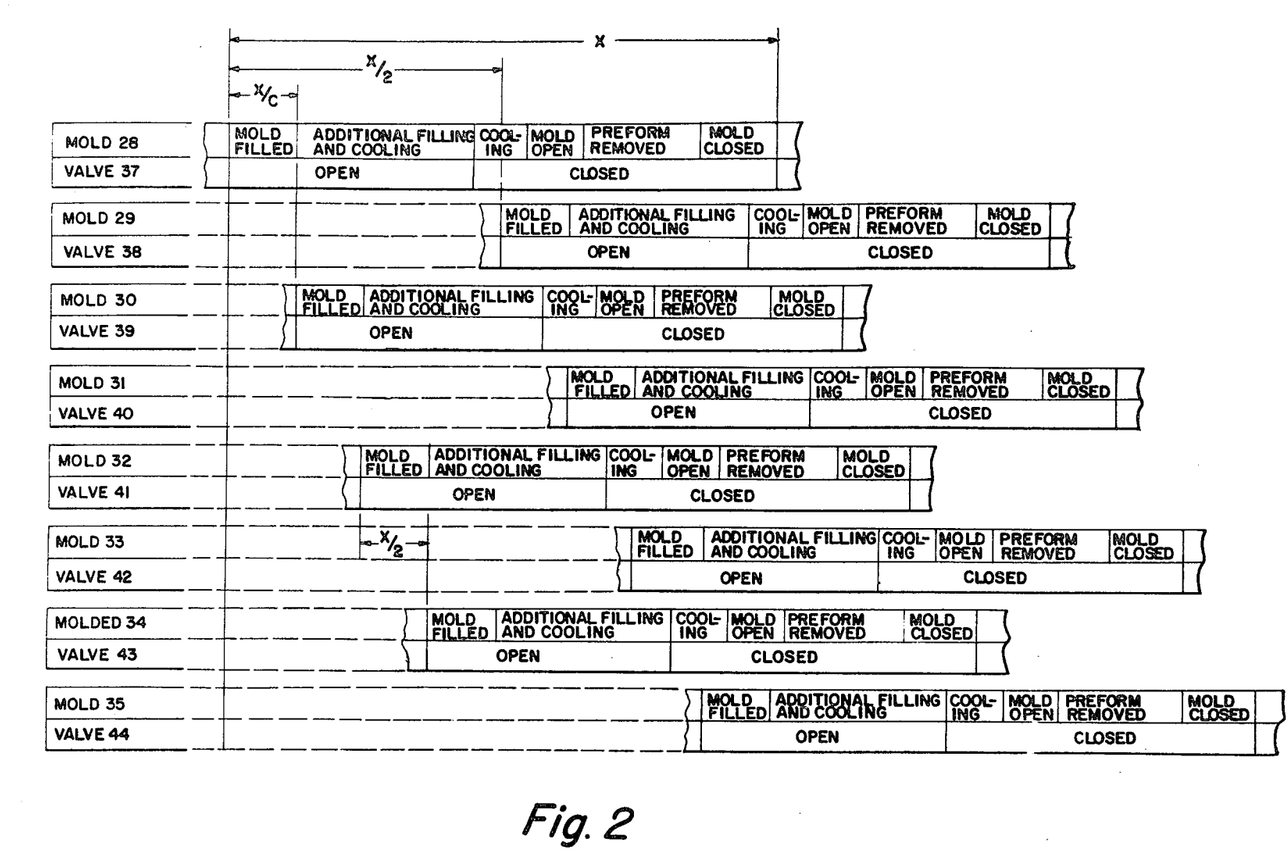
FIGS. 2 and 3 are sequence charts showing the timing relationship of the steps in the method of the present invention.

The operation of the molds is sequential as shown, for example, in FIG. 2. The valves 37–44 are controlled to open sequentially at equally spaced time intervals, with one valve opening every X/c seconds. The sequence is arranged so that each valve in each set of valves opens in equally spaced time intervals with the others of the set. For example, in the illustrated embodiment in which there are two valves in each set, such as the valves 37 and 38, the time interval between the opening of the first valve 37 and the opening of the second valve 38 will be equal to the time interval between the opening of the valve 38 and the subsequent opening of the valve 37. Each valve in the set (or pair) of valves will open once in the X second time interval. A typical sequence for the apparatus might then be the opening of valves 37, 39, 41, and 43, and then the opening of valves 38, 40, 42, and 44, in order (see FIG. 2). Thus, the melt stream from each of the runners 14–17 is fed sequentially to each mold of the set of molds, and the output of the extruder 10 is utilized on a continuous basis. By staggering the operation of the valves so that each valve is operated in a sequential manner, the pressure gradients produced in the melt stream which occur during valve actuation as the melt stream is shifted from one runner to another are reduced and the continuity of the extruder output is maintained.

The operation of each mold in each set of molds is similarly arranged so that each mold operates at equally spaced time intervals with the other molds in the set. For example, the time between the opening of the mold 28 and the opening of the mold 29 is equal to the interval between the opening of the mold 29 and the subsequent opening of the mold 28.

If a large number of molds is utilized for high production, the molds may be grouped and operated together and a combination of valves may be operated in tandem.

The runner system is structurally adequate to contain the pressurized melt stream and is heated and temperature controlled to maintain proper melt viscosity. The melt is conveyed to the molds entirely by the pressure of the extruder output. The entire runner network has carefully chosen inside cross sectional area and length and represents the ideal compromise between total inventory and pressure flow losses for minimum generation of detracting by-products, such as acetaldehyde when molding PET.

The runner system is also designed with minimal size and minimal time during which the material is at elevated temperature to reduce the energy consumption of the system as much as possible and make it as energy-efficient as possible and to minimize the time over which the thermoplastic resin is held at temperatures at which it can degrade and produce unwanted by-products.

The design of the screw of the extruder 10 has sufficient pressure sensitivity to avoid excessive pressure during the transient intervals when the valves are operating in the event that there is no valve open to allow the flow into a preform mold.

The duration of the mold cycle, specified herein for convenience as X seconds, will vary with the size of the preform being molded, the number of cavities per mold, the condition of the raw plastic material, and other factors known to those skilled in the art. Hence, the extruder 10 must have an adjustable output rate and drive speed. An electrical pulse generator may be attached to the driving mechanism of the extruder 10. A suitable pulse counting and computing circuit may then be adjusted and set to produce an ideal relationship between the drive speed of the extruder 10 and the desired mold cycle. The electrical circuit then generates the basic time cycle of X seconds and, in addition, provides the fractional subintervals for sequence control of the valves 37–44, the mold opening and closing, and other operations. This method of cycle control groups all predictable cycle requirement variations under a single set-point variable which may be further enhanced by a suitable closed-loop feedback for automatic compensation of unpredictable process variables.

The preforms are removed from each of the molds 28–35 by the preform transfer devices 46–49. A preform transfer device is provided for each set of molds. Each set of molds operates to produce preforms at regular intervals with the number of groups of preforms produced by the set every X seconds equal to the number of molds in the set. In the illustrated embodiment in which there are two molds in each set, two groups of preforms are produced every X seconds. Thus, each set of molds produces preforms every ½ X seconds, and the preform transfer devices 46–49 are sequenced to handle preforms every ¼ X seconds.

Figure 3:
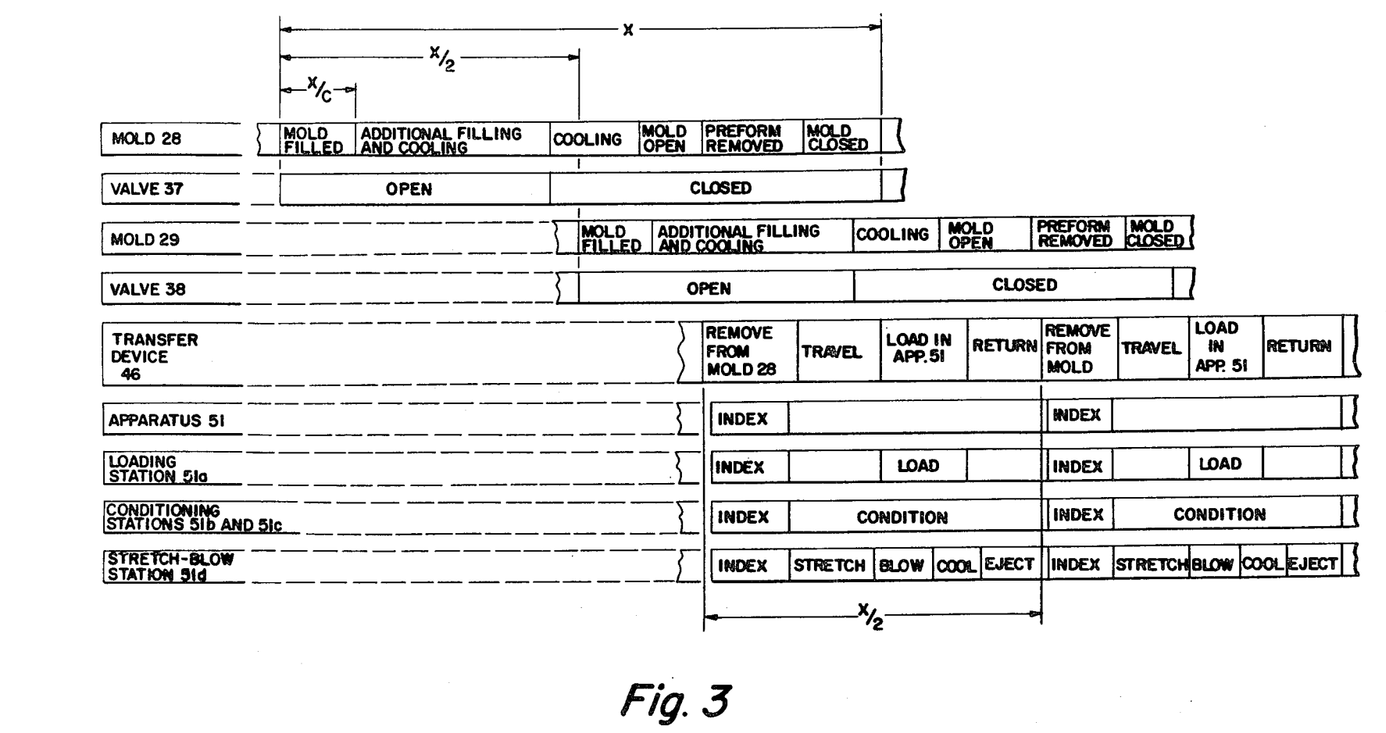

All of the preform transfer devices 46–49 are identical and will be described with reference to the preform transfer device 48. The preform transfer device 46 is first oriented to the preform mold 28 and upon opening of the mold 28, the device 46 retrieves the preform from the mold 28. Suitable controls cause the device 46 then to transport the preform to the loading station of the rotary stretch-blow-molding apparatus 51. The device 46 deposits the preform at the loading station. The controls then cause the device 46 to reorient to the mold 29 at an appropriate time interval coinciding with the opening of the mold 29. As previously discussed, the set of molds 28 and 29 are controlled to operate at equally spaced time intervals. The device 46 retrieves the preform from the mold 29 and transfers the preform to the same loading station of the apparatus 51 in a similar manner. Thus, preforms are delivered to the loading station of the apparatus 51 every ½ X seconds (FIG. 3).

The preform transfer device 46 handles the preforms only by their closure ends, where substantially greater cooling has taken place. This minimizes the possibility of damage to the preforms and ultimately to the finished plastic articles. The preforms are deposited in fixtures on the stretch-blow apparatus 51 which, again, has physical contact only with the closure ends.

The preforms must be blown at their orientation temperature, i.e., the temperature at which the polymer molecules in the preform are plastic enough to be oriented linearly, but at which reorientation of the molecules is relatively slow. The orientation temperature is somewhat above the glass transition temperature.

It should be borne in mind that the temperature of the molded preform is not actually uniform in cross section as the preform comes out of the mold. The outer surface might be, for example, 100° F., the center 300° F. and the inner surface 180° F. The average temperature might be about 200° F. The dilemma of the processor is thus to have a fast continuous process and also have a preform with a temperature throughout the section being blown as uniform as can be achieved in the time allowed.

The preforms are quickly removed from the molds and transferred to the stretch-blow apparatus where they are blown. This reduces the amount of temperature conditioning necessary to blow the preforms and results in a continuous and an energy efficient operation. The preforms may be blown within a minute after being molded, and preferably, should be blown within 30 seconds after being molded.

Upon loading of the preforms into the rotary stretch-blow-molding apparatus 51–54, the preforms are conditioned, stretched, and blown into finished plastic articles in accordance with the known principles of plastic blow-molding art. The rotary stretch-blow-molding apparatus 51–54 are all identical and will be described with reference to the apparatus 51. The apparatus 51 contains a number of stations, a total of six stations being available in the form of the invention shown in FIG. 1, but only four of these stations being used. The first station is the loading station 51a at which the preforms are loaded on the apparatus by the device 46. Fixtures for receiving the semicooled preforms deposited by the transfer device 46 are attached to an indexing device and are wholly mechanical and self-contained. The number of groups of fixtures is equal to the number of stations in the apparatus 51 with a group of fixtures located at each station, six groups of fixtures being shown in the apparatus of FIG. 1. The fixtures are able to receive and retain the preforms, to locate, protect, transfer, support, and release the closure ends of the preform and finished container during the various stages of the production process.

After loading, the preforms are sequentially indexed through one or more temperature conditioning stations. Two temperature conditioning stations 51b and 51c are shown in FIG. 1. At each of these stations, in accordance with known techniques, heating devices are brought into close proximity and through suitable controls, add or maintain sufficient thermal energy uniformly to or in the preforms to make them ideally suited for subsequent orientation by means of the stretching and blowing operations. It is preferable that each preform be brought to the same uniform temperature throughout the portion of the preform which will be blown. The actual conditioning devices may be telescoping canister-like devices for exterior transfer or shaped surface for heating and/or cooling. An internal heating or cooling device may also be used to condition the preform. Any one of a combination of these or similar devices well-known in the art, may be used to transfer energy to or from the preforms using radiant, convection, or conduction heat transfer.

After the preforms have been indexed through one or more stations for the temperature conditioning, the preforms are indexed to the stretching and blowing station 51d. At this station, the apparatus 51 may include any of several known types of mechanisms to stretch and blow the preform into the finished product. Initially after indexing to the stretching and blowing station 51d, a container mold closes around the preform in such a way that the preform holding fixtures are guided into and are mechanically interlocked with the mold cavities. A rodlike device is then inserted through the neck of the preform to effect preform stretching. A sealing device is actuated at this time to ensure air pressure sealing of the container. A controlled flow of compressed air is simultaneously introduced to produce stretch and pressure expansion combinations to achieve the desired expansion rate and the finished container wall thickness, orientation, and surface detail. Following a suitable cooling time within the mold, the external air pressure is released, the stretching rods are withdrawn, and the mold clamping device is opened. Finished containers or other plastic products ready for subsequent operations, such as base application, labeling, printing, or other operations, are ejected directly from the molds at this station 51d. The products may be ejected onto a suitable conveying device to be removed from the area around the machine.

Since a new group of preforms is loaded into the apparatus 51 every ½ X seconds in the illustrated embodiment of the invention, the apparatus is indexed every ½ X seconds. As shown in FIG. 3, indexing thus occurs in synchronization with the preform production and handling apparatus. Subcycles of mechanisms at the various work stations function within the time interval prescribed by the mold cycle X. For example, all of the operation at the stretching and blowing station 51d of the apparatus 51 occurs within the interval ½ X seconds. The time intervals are thus proportioned for the intended range of end products. Each of the four rotary stretching and blowing apparatus 51–54 produces a group of finished plastic articles every ½ X seconds, while each of the eight preform molds 28–35 is sequenced to produce a group of preforms every X seconds. This ratio is the one used for the illustrated embodiment of the invention and is believed to be capable of producing maximum utilization of the preform molding apparatus and blowing and stretching apparatus, which in processes of the prior art required less efficient operation in either or both areas.

The number of molds 28–35 and stretch-blow-molding apparatus 51–54 and the ratio of molds to apparatus described herein and shown in FIG. 1 is believed to be the optimum configuration for utilization of the output of the extruder 10 on a continuous basis for the production of plastic beverage containers, such as PET containers. However, the number and ratio of components of the system will vary depending upon various factors, including the size of the containers, the size of the extruder 10, the amount of the extruder output, the mold cycle time, the stretch-blow cycle time, and other factors. Thus, it is possible to have a runner system 12 with as few as two runner pipes from the output of the extruder 10 and two sets of molds or with as many as ten or more runner pipes and ten or more sets of molds, and it is possible to have as few as two molds in a set and as many as four molds or more in a set operating in sequence. For example, if the stretch-blow-molding operation could be accomplished in one-third of the time required to form a preform, the molds would be arranged in sets of three molds. For each set of molds, there would be a single preform transfer device 46 and single rotary stretch-blow-molding apparatus 51.

As the molds are operated sequentially, the preform transfer devices 46–49 will also be operating sequentially and the rotary stretch-blow-molding apparatus 51–54 will be indexing sequentially, rather than simultaneously. Thus, a finished plastic device will be produced sequentially by each of the apparatus 51, 52, 53, and 54, producing a continuous stream of product output.

Although the preform molds preferably are identical, it is contemplated that different sized molds may be paired and incorporated in the system so that two different preforms may be molded continuously in accordance with this process. In such event, the stretching and blowing stations 51–54 would be matched to the preforms.

Injection rates higher than the rate at which melt is produced by the extruder may at times be necessary to obtain good preform quality. If this is required, the extruder screw may be stroked to produce pulses of output in a manner somewhat similar to conventional injection processes, but with continued screw rotation. In this case, the injection time may be independently controlled while only the recovery time remains an aliquot part of the X second mold cycle.

The method and apparatus of the present invention has application for any thermoplastic which can be blow-molded, such as polyethylene terephthalate (PET), low and high density polyethylenes, polycarbonates, acrylonitriles, acrylics and others.

While the invention has been shown and described with respect to specific embodiments thereof, these are intended for purposes of illustration rather than limitation. Other modifications and variations in the specific forms of the invention herein shown and described will be apparent to those skilled in the art, all within the intended scope and spirit of the invention. Accordingly, the invention is not to be limited to the specific embodiments herein shown and described, nor in any other way which is inconsistent with the extent to which the progress in the art has been advanced by this invention.

What is claimed is:

1. Apparatus for making plastic articles from a thermoplastic resin material which comprises:
   an extruder for producing a stream of plasticized resin material;
   a runner system extending from the extruder for containing the stream of plasticized resin material at an elevated temperature;
   a plurality of preform molds connected to the runner system for forming preforms from the plasticized material received through the runner system, the molds being disposed in two or more sets each having at least two molds;
   valve means in the runner system for directing the flow of the stream of plasticized resin sequentially into the preform molds;
   means for blowing the preforms into plastic articles, a separate blowing means being provided for each set of molds; and
   means for transferring the preforms while they are warm from each of the sets of molds to the corresponding blowing means.

2. Apparatus for making plastic articles as in claim 1, wherein a transferring means is provided for each blowing means.

3. Apparatus for making plastic articles as in claim 1, wherein the extruder is a continuously operating extruder.

4. Apparatus for making plastic articles as in claim 1, wherein each blowing means includes means for temperature conditioning uniformly the preforms and stretching the preforms prior to blowing.

5. Apparatus for making articles as in claim 1, wherein each preform mold has a plurality of cavities each of which is adapted for forming a preform.

6. Apparatus for making plastic articles from a thermoplastic resin material which comprises:
   (a) an extruder having means for heating and extruding plasticized resin;
   (b) at least two first molds for forming a preform;
   (c) at least two second molds for forming a preform, the number of second molds being equal to the number of first molds, each second mold being associated with one of the first molds to form a set of molds;
   (d) a runner system extending from the extruder for feeding the plasticized resin into the first and second molds;
   (e) valve means connected to the runner system for allowing the plasticized resin material to be fed sequentially into the first and second molds;
   (f) at least two apparatus units each of which includes means for uniformly temperature conditioning the preforms, means for stretching and orienting the preforms, and means for blowing the preforms into the plastic articles, the number of apparatus units being equal to the number of sets of first and second molds; and
   (g) means for transferring the preforms while they are warm from each set of the first and second molds to one of the apparatus units.

7. Apparatus for making articles as in claim 6, wherein the extruder has means for extruding plasticized resin.

8. Apparatus for making articles as in claim 6, wherein each apparatus unit also includes means for ejecting the plastic articles therefrom.

9. Apparatus for making hollow plastic articles from a thermoplastic resin material, which comprises:
   means for extruding plasticized resin in a hot stream;
   means for forming preform comprising a plurality of preform molds disposed in at least two sets of molds having two or more molds in each set;
   means for directing the stream of resin sequentially into the preform molds;
   means for blowing the preforms into plastic articles comprising a plurality of blowing apparatus, there being a separate blowing apparatus for each set of molds; and
   means for transferring the preforms while they are warm sequentially from each mold of each set of molds to one of the blowing apparatus.

10. Apparatus for making hollow plastic articles as in claim 9, wherein the extruding means includes means for continuously extruding resin.

11. Apparatus for making hollow plastic articles as in claim 9, wherein the blowing means includes means for uniformly temperature conditioning the preforms prior to the blowing of the preforms into plastic articles.

12. Apparatus for making plastic articles from a thermoplastic resin material which comprises:
   an extruder for continuously extruding plasticized resin material in a continuous stream of hot plasticized material;
   a plurality of preforms molds for sequentially forming a plurality of preforms, the molds disposed in at least two sets of molds having two or more molds in each set;
   means for sequentially feeding the continuous stream of plasticized material to the plurality of preform molds;
   at least two blowing apparatus for blowing the preforms into the plastic articles, there being a separate blowing apparatus for each set of molds; and
   means for transferring each of the preforms from the molds to the blowing apparatus for that set of molds before the preforms cool substantially, including means for transferring the preforms from each set of molds directly to a single blowing apparatus.

13. Apparatus for making plastic articles from a thermoplastic resin material, which comprises:
   means for extruding hot plasticized resin;
   a plurality of preform molds for forming preforms, the molds disposed in at least two sets of two or more molds each;
   means for feeding the plasticized resin sequentially into alternate molds of the plurality of preform molds;
   at least two blowing apparatus for blowing the preforms into plastic articles, there being a separate blowing apparatus for each set of two or more molds;
   means for transferring the preforms while they are still warm sequentially from each mold of one set of molds directly to one of the blowing apparatus; and
   means for transferring the preforms while they are still warm sequentially from each mold of each other set of molds directly to each other blowing apparatus.

14. Apparatus for making plastic articles as in claim 13, wherein the extruding means includes means for extruding continuously.

15. Apparatus for making plastic articles as in claim 13, wherein each set of molds comprises a pair of molds, the feeding means feeds the plasticized resin to at least two pairs of preform molds, preforms are formed in one of each pair of molds, and each of the transferring means transfers the preforms sequentially from each mold of each pair of molds directly to the blowing apparatus for that pair of molds.

16. Apparatus for making plastic articles as in claim 13, wherein each of the blowing apparatus includes means for temperature conditioning uniformly the preforms prior to the blowing of the preforms into plastic articles.

17. Apparatus for making plastic articles as in claim 13, wherein the blowing apparatus blows each preform into a plastic article within one minute after it is formed.

18. Apparatus for making plastic articles, which comprises:
means for extruding a stream of hot plasticized resin;
a plurality of preform molds disposed in at least two sets of molds with each set comprising two or more molds;
means for directing the stream sequentially into the preform molds to form a preform in each mold;
means for blowing the preforms into plastic articles, comprising a separate blowing apparatus for each set of two or more molds; and
means for removing the preforms from each mold in one of the sets of molds and for transferring them directly to the blowing apparatus for that set of molds before the preforms cool substantially, the preforms being transferred sequentially from each mold of the set.

19. Apparatus for making plastic articles as in claim 18, wherein the extruding means includes means for extruding the resin as a continuous stream.

20. Apparatus for making plastic articles as in claim 18, wherein the blowing means includes means for temperature conditioning the preforms uniformly prior to blowing the preforms into plastic articles.

21. Apparatus for making plastic articles as in claim 18, wherein the blowing means blows each preform into a plastic article within one minute after it is formed.

22. Apparatus for making plastic articles as in claim 21, wherein the blowing means blows each preform into a plastic article within 30 seconds after it is formed.

23. Apparatus for making plastic articles as in claim 18, wherein there are c molds and c is an integer of 4 or more, any one of the molds forms a preform every X seconds, and the blowing apparatus blows the preforms into plastic articles in a cycle of an aliquot portion of X seconds.

24. Apparatus for making plastic articles as in claim 23, wherein the plurality of molds together forms one preform every X/c seconds.

25. Apparatus for making plastic articles as in claim 23, wherein all of the blowing apparatus blow preforms into plastic articles every X/c seconds.

26. Apparatus for making plastic articles as in claim 23, wherein the directing means substantially fills each mold during a period of X/c seconds.

* * * * *

UNITED STATES PATENT AND TRADEMARK OFFICE
CERTIFICATE OF CORRECTION

PATENT NO. : 4,470,796
DATED : September 11, 1984
INVENTOR(S) : John F. Stroup et al.

It is certified that error appears in the above—identified patent and that said Letters Patent is hereby corrected as shown below:

Column 8, line 7, "48" should be --46--.

Column 12, line 7, "preform" should be --preforms--.

Column 12, line 31, "preforms" should be --preform--.

*Signed and Sealed this*

*Twenty-sixth* Day of *February 1985*

[SEAL]

Attest:

DONALD J. QUIGG

*Attesting Officer*   *Acting Commissioner of Patents and Trademarks*